UNITED STATES PATENT OFFICE.

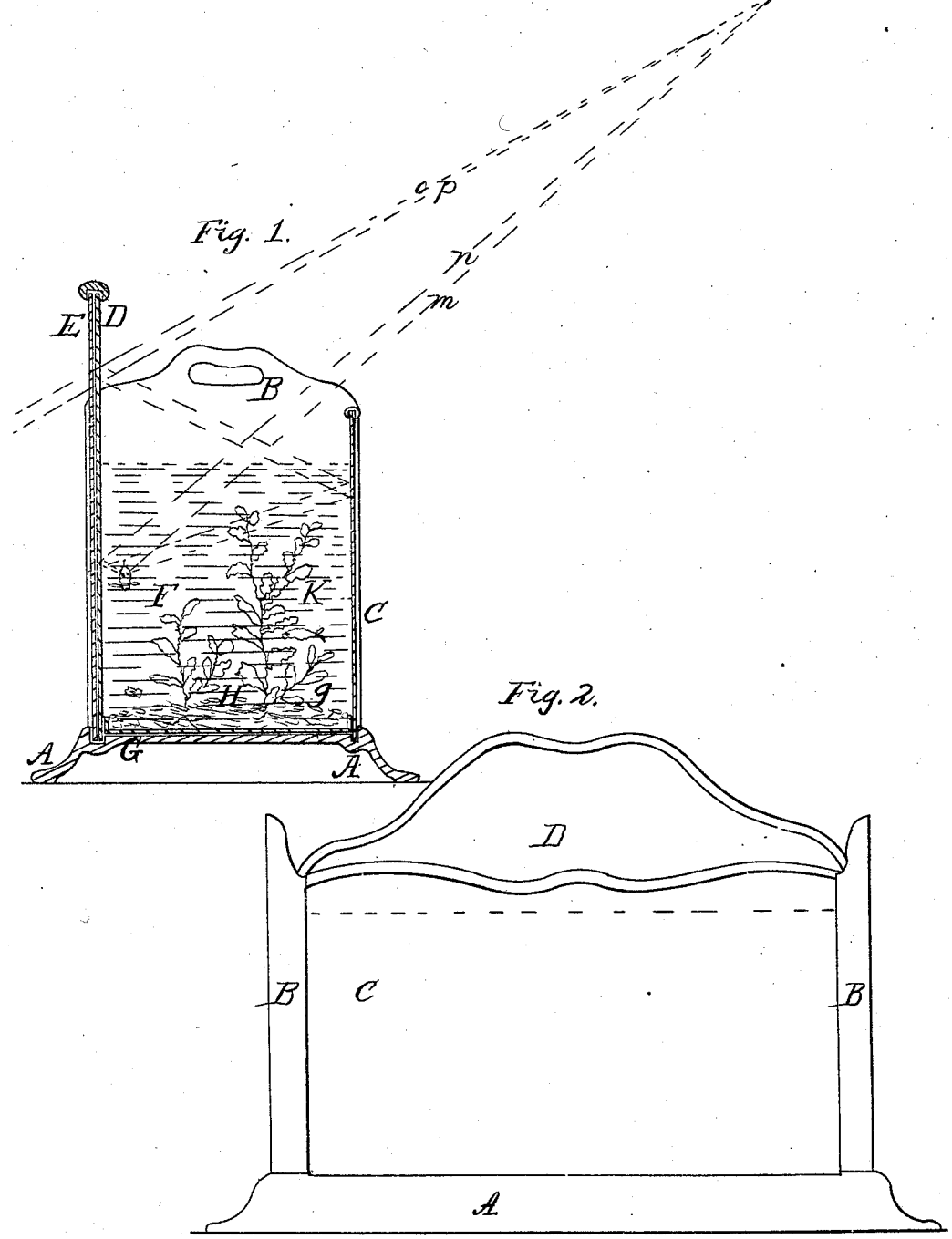

ELIJAH D. DAVIS, OF BROOKLYN, NEW YORK.

IMPROVEMENT IN AQUARIA.

Specification forming part of Letters Patent No. 22,019, dated November 9, 1858.

*To all whom it may concern:*

Be it known that I, ELIJAH D. DAVIS, of Brooklyn, in the county of Kings and State of New York, have invented certain new and useful Improvements in Aquaria; and I do hereby declare that the following is a full, clear, and exact description of the construction and operation of the same, reference being had to the annexed drawings, and to the letters of reference marked thereon, in which—

Figure 1 is a transverse vertical section, and Fig. 2 is a front elevation.

The first part of my invention is based on the fact that under certain circumstances much of the light passing from a denser to a rarer medium is reflected.

It consists in the employment, in the back of a suitably-proportioned aquarium, of a mirror the upper edge of which is a certain quantity higher than the front of the aquarium, so as to display to the eye of a spectator located in any planes between about forty and fifty degrees inclination above the center of the aquarium more than one reflected image of the objects in the water.

By my improvement the breadth of an aquarium appears increased to three or more times its actual breadth, while an apparent increase to only twice the actual breadth results from the employment of mirrors as heretofore used in the backs of show-cases, cages for animals, puppet-shows, cabinets, &c.

The second portion of my invention consists in inclosing the earth and the roots of the plants in a false bottom or shallow vessel and protecting its upper surface, except at the points where the plants emerge, by a strong pavement of coarse gravel or a coating of cement, which device allows the earth and plants to be lifted out without disturbing them whenever it is desired to cleanse or remove the aquarium, and also allows the surface of the earth and the plants to be washed and rinsed with considerable vigor without disturbing the roots. This also allows the use of fine mud and soil of various kinds as a sustenance for the plants, whereas nothing but clean sand and gravel can be used in aquaria as heretofore made.

To enable others skilled in the art to make and use my invention, I will proceed to describe its construction and operation by the aid of the drawings.

A is the bottom, B B the ends, and C the front plate, of the aquarium, all constructed in the ordinary manner, except that the breadth of the aquarium is less than usual. D is a plate of ordinary silvered glass. E is a sheet of any suitable material to protect the amalgam and increase the strength of the back. The back E D is much higher than the front C, as represented.

For ornamental effect I give a curved or wavy outline to the upper edges both of D and C, but the general proportions I adopt are about as follows: Length of aquarium, two feet; height of ends B, seventeen inches; height of front C, fourteen inches; height of back D, twenty inches. These dimensions allow the effect of my invention to be very finely produced. Neglecting the effect of refraction, which does not materially change it, the rays of light strike from an object within the aquarium to the eye of a spectator about forty-five degrees above in the manner shown by the red lines *m n o p*. In the line *m* the fish F is seen directly. In the line *n* its image is seen reflected from D. In the line *o* is seen its image twice reflected, first by the front C and next by the back D. In the line *p* is seen its image three times reflected, first by D, then by C, and finally again by D, as represented. So strong is the reflection offered by the front C, under these circumstances, to light coming to it from the rear that but little if any difference is perceptible to the unpracticed eye between the strength of the images once and twice reflected, or, in other words, of images *n* and *o*. It may be remarked that this effect is produced only in certain positions of the eye. As the spectator walks backward from the aquarium all the images which depend on the reflective power of C vanish suddenly at a certain point.

The false bottom G is constructed with sides and ends to enable it to contain earth, and is provided with hooks or equivalent means, by which it may be raised bodily.

Before filling the aquarium I fill G with earth H, of any character I please, and transplant therein one or more marine or subaqueous plants, K. I then prepare a quantity of plaster-of-paris, (calcined gypsum and water,) and spread a sheet, *g*, from one-eighth to one-half inch in thickness over its whole surface, except at the points where the stems of the plants emerge. I then press into its soft surface as many clean sandy particles, gravel-stones, and the like, as it will receive, and lower the whole carefully into the aquarium, which I then fill with water, adding the fish and other animals. Protected by the surface-coating g the earth H is not agitated by any action of the animals, nor by any movement of the hand in catching them, nor by adding or removing water, and when, as is invariably the case after a few weeks or months of use, the sides and bottom of the aquarium become dirty, the whole of the earth and plants may (after removing the fish) be lifted out without disturbance, and the aquarium, as also all the surfaces of G and g, may be washed and rinsed.

When a plant, K, is to be removed or inserted I break a hole in the plastered surface g for the purpose, mending it again with fresh plaster when the job is completed.

What I claim in aquaria as my invention is—

1. The mirror D, extending above the level of the front plate, C, and arranged, in relation thereto and to the contents of the aquarium, substantially in the manner and for the purposes above set forth.

2. The sustaining of the earthy matter H in a removable bottom, G, and protecting its upper surface by a hard coating, g, for the purposes above set forth.

ELIJAH D. DAVIS.

Witnesses:
BENJ. T. HILLING,
THOMAS D. STETSON.